United States Patent
Larson et al.

(10) Patent No.: US 10,476,152 B2
(45) Date of Patent: Nov. 12, 2019

(54) SYSTEM AND METHOD FOR AUTOMATIC REAL TIME CONTROL OF THE ROTATIONAL SPEED OF A RADAR ANTENNA

(71) Applicant: The United States of America as represented by the Secretary of the Navy, San Diego, CA (US)

(72) Inventors: Jacoby Larson, La Mesa, CA (US); Darren Powell, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 227 days.

(21) Appl. No.: 15/843,128

(22) Filed: Dec. 15, 2017

(65) Prior Publication Data

US 2019/0190144 A1    Jun. 20, 2019

(51) Int. Cl.
| | |
|---|---|
| *H01Q 3/00* | (2006.01) |
| *H01Q 3/04* | (2006.01) |
| *G06T 7/70* | (2017.01) |
| *G06K 9/00* | (2006.01) |

(52) U.S. Cl.
CPC ........... *H01Q 3/04* (2013.01); *G06K 9/00201* (2013.01); *G06T 7/70* (2017.01); *G06T 2207/10044* (2013.01)

(58) Field of Classification Search
None
See application file for complete search history.

(56) References Cited

U.S. PATENT DOCUMENTS

| | | | |
|---|---|---|---|
| 2,797,374 A | | 6/1957 | Montague et al. |
| 2,885,620 A | | 5/1959 | Haas |
| 4,967,199 A | * | 10/1990 | Gunton ............... G01S 13/0209 342/158 |
| 5,294,936 A | * | 3/1994 | Hall ..................... G01S 7/4004 342/175 |
| 5,351,060 A | | 9/1994 | Bayne |
| 8,344,938 B2 | * | 1/2013 | Leferink ............... H01Q 1/521 342/159 |
| 8,909,375 B2 | | 12/2014 | Larson et al. |
| 9,065,381 B2 | | 6/2015 | Liu et al. |
| 9,684,062 B2 | * | 6/2017 | Ohnishi ................... G01S 7/02 |
| 2011/0050483 A1 | | 3/2011 | Leferink |

(Continued)

*Primary Examiner* — Trinh V Dinh

(74) *Attorney, Agent, or Firm* — Naval Information Warfare Center, Pacific; Kyle Eppele

(57) ABSTRACT

A method and system which enable the automatic adjustment of the rotational speed of a radar antenna in a radar system having a continuously rotating radar antenna based on where objects are being detected. The automatic adjustment of the rotational speed of the radar antenna is controlled by a controller integrated with the radar system and is based on the bearing of the emitting antenna relative to objects being detected. The method relies on continuously reading the angular position of the antenna and corresponding the presence of detected objects to this angular position so as to automatically adjust the speed of the antenna to slow down the antenna while it is directing wave signals towards detected targets and speed up the antenna while it is directing wave signals in a direction where there are no detected objects.

20 Claims, 2 Drawing Sheets

(56) References Cited

U.S. PATENT DOCUMENTS

| | | | |
|---|---|---|---|
| 2012/0013515 A1* | 1/2012 | Berejik | H01Q 1/125 |
| | | | 343/766 |
| 2013/0169468 A1* | 7/2013 | Johnson | G01S 13/02 |
| | | | 342/41 |
| 2016/0138946 A1* | 5/2016 | Grau | G01D 5/48 |
| | | | 342/361 |

* cited by examiner

SYSTEM AND METHOD FOR AUTOMATIC REAL TIME CONTROL OF THE ROTATIONAL SPEED OF A RADAR ANTENNA

STATEMENT OF GOVERNMENT INTEREST FEDERALLY SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif. 92152; telephone (619) 553-5118; email: ssc_pac_t2@navy.mil. Reference Navy Case No. 103,513.

BACKGROUND OF THE INVENTION

Field of the Invention

This invention relates generally to radar systems and, more particularly, to the automatic real time control of the rotational speed of radar antennas.

Description of the Prior Art

The operation and use of radar systems which utilize electromagnetic wave emissions to determine the range, angle, or velocity of objects is well established. Radar systems will typically include a transmitter, one or multiple antennas, a receiver and processor. The transmitter works with the antennas to produce electromagnetic waves. The receiver works with the antennas to receive electromagnetic waves which have been reflected off object(s). The processor works with the output of the receiver to determine properties such as location and speed of the object(s) from which the electromagnetic waves were deflected. In many embodiments, radar systems employ electromagnetic waves in the radio or microwave domain (referred to generally herein as "radar waves" or "wave signals").

In many implementations, radar systems employ a motor driven radar antenna which rotates three hundred sixty degrees (360°). In such implementations, the motor will typically rotate the antenna continuously at the same speed while in operation. Notably, it is possible for the radar antenna to have more than one speed of rotation, as many have two: forty eight (48) revolutions per minute ("rpm") or twenty four (24) rpm. But in such cases, the operational speed is set up on initialization and does not dynamically change based on the environment or application's requirements.

As a result, when a specific target is detected, the radar antenna continues to spin at the same speed and does not capture more accurate resolution data because it cannot slow down its speed. Similarly, when there are no detections in the environment, the radar antenna continues to rotate at the same speed and does not speed up to provide a quicker acquisition to targets. Thus, if the radar antenna detects a specific target, it would not return that target again until the radar antenna has rotated a full 360 degrees. For a radar spinning at 48 rpm, this would take 1.25 seconds, which is a long time to wait to see the activity of a target, particularly a potentially threatening target such as an enemy plane.

Thus, there remains a need for a system and method that automatically adjust the rotational speed of a continuously rotating radar antenna through a software application. There is further a need for the adjustment to be based on a real time analysis of radar returns which identifies where targets are being detected.

SUMMARY OF THE INVENTION

The present disclosure describes a system and method for automatic real time control of the rotational speed of a radar antenna based the location of objects being detected. In accordance with one embodiment of the present disclosure, a method is provided for automatic real time control of the rotational speed of a radar antenna. The method includes: providing a radar system having a rotating antenna adapted to emit radar waves while rotating three hundred sixty degrees at a first rotational speed, wherein the radar system is electronically connected to a receiving system, wherein the receiving system is adapted to determine a location of an object off which the radar waves emitted from the rotating antenna were reflected; receiving by a controller integrated with the radar system an angle input which identifies a real time rotation angle of the rotating antenna; identifying at least one target object off which radar waves emitted from the rotating antenna were reflected; determining the location of the at least one target object as a function of the rotation angle of the rotating antenna; and once the location of the at least one target object is determined as a function of the rotation angle of the rotating antenna, adjusting a rotational speed of the rotating antenna based on whether radar waves emitted from the rotating antenna are emitted in a direction of the at least one target object, wherein the rotational speed is adjusted relative to the first rotational speed.

DETAILED DESCRIPTION OF THE INVENTION

Applicant's invention described herein provides a method and system which enable the automatic adjustment of the rotational speed of a radar antenna in a radar system having a continuously rotating radar antenna. The automatic adjustment of the rotational speed in the instant method and system is based on where objects are being detected. Current radar hardware usually spins continuously 360 degrees at the same speed as it actively generates wave signals. The instant invention allows for automatic downward adjustment of the speed of the antenna while the antenna is directing wave signals towards detected targets. The instant invention allows for automatic upward adjustment of the speed of the antenna when the antenna is directing wave signals in a direction where there are no detected targets. This allows the radar system to better monitor existing targets while still scanning for the appearance of new targets.

Figure 1:
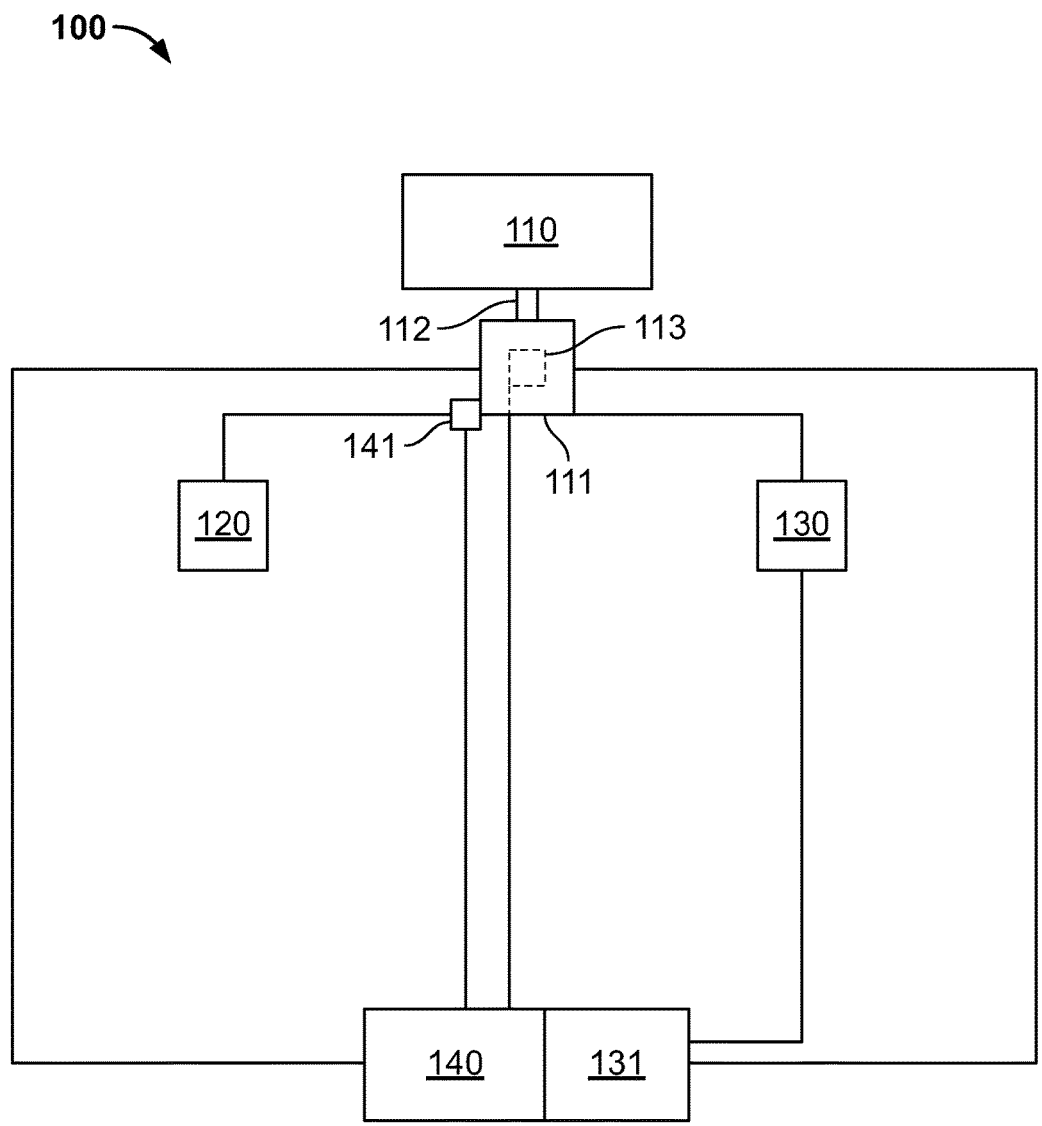
FIG. 1 shows the components of a radar system employing a system and method for automatic real time control of the rotational speed of a radar antenna in accordance with the present invention.

Referring now to FIG. 1, the primary components of a radar system 100 having automatic real time control of the rotational speed of a radar antenna include a continuously rotating radar antenna 110 that is operatively connected to a motor 111 by way of a shaft 112, as well as a transmitter 120, a receiving system which includes a receiver 130 and a processor 131, a controller 140, and a control switch 141. It is appreciated that the antenna 110, transmitter 120, and receiving system may be generally arranged and connected as with traditional radar systems, and together operate to produce radar waves, receive radar waves which have been reflected off object(s), and determine properties such as location and speed of the object(s) from which the radar waves were reflected.

The motor 111 in accordance with the present invention is connected to the control switch 141 such that the motor 111 can receive commands related to operation speed changes from the control switch 141 and, in response to such commands, change its operational speed. The control switch 141 may be a conventional electrical switch which is integral with the motor 111 and operative to command the motor 111 to adjust the motor's 111 operational speed in response to an input signal from the controller 140. Alternatively, the control switch 141 may be a software switch which is integral with the motor 111 and operative to command the motor 111 to adjust its operational speed in response to an input signal from the controller 140.

The control switch 141 is operatively connected to the controller 140 so as to allow the controller 140 to send electrical signals to the control switch 141 which may be used by the control switch 141 as input signals. The controller 140 is additionally electrically connected to a rotary encoder 113 which is integrated with the shaft 112 and operative to convert the angular position of the shaft 112, as a reflection of the rotation angle of the antenna, to an analog or digital signal. Through the signal which reflects the real time the rotation angle of the shaft 112, and by extension the antenna 110, the controller is able to determine at all times the bearing of the antenna 110.

The controller 140 is also electrically connected to the processor 131 so as to be able to access the output of the receiving system containing properties such as location and speed of the object(s) from which the radar waves were deflected.

The controller 140 includes one or more software applications contained thereon or otherwise accessible thereto which configure the controller 140 to take the signal which reflects the real time rotation angle of the shaft and antenna as an input. The one or more software applications also configure the controller 140 to take as an input the output of the receiving system. Using the output of the receiving system, the controller 140 operates to (1) track the bearing of the antenna 110 at all times, (2) identify when objects have been detected, and (3) determine the location of detected objects as a function of the bearing of the antenna 110 by recognizing the bearing of the antenna 110 when radar waves from the antenna are being deflected. Using this determination, the software application(s) on the controller 140 causes an electrical signal to be sent from the controller 140 to the control switch 141 that causes the control switch 141 to speed up the operation speed of the motor 111.

In operation, the controller 140 causes an increase in the rotational speed of antenna 110 when its bearing is such that it is not acquiring data on an object or target, which would reduce the amount of time between detections. Being able to increase the detection cycles on an enemy missile from 1.25 seconds to 0.1 seconds would improve anti-missile defense.

In contrast, when the bearing of the antenna 110 is such that it is acquiring data on an object or target, the controller 140 causes a decrease in the rotational speed of antenna 110. This decrease in rotational speed provides for higher resolution radar on the object or target. The speed of rotation, the physical size of the antenna, and the beam width define the resolution of the captured data. Slowing the rotation of antenna 110 and using the returned value for a bearing enables over-sampling an area to create a higher resolution data collection.

Figure 2:
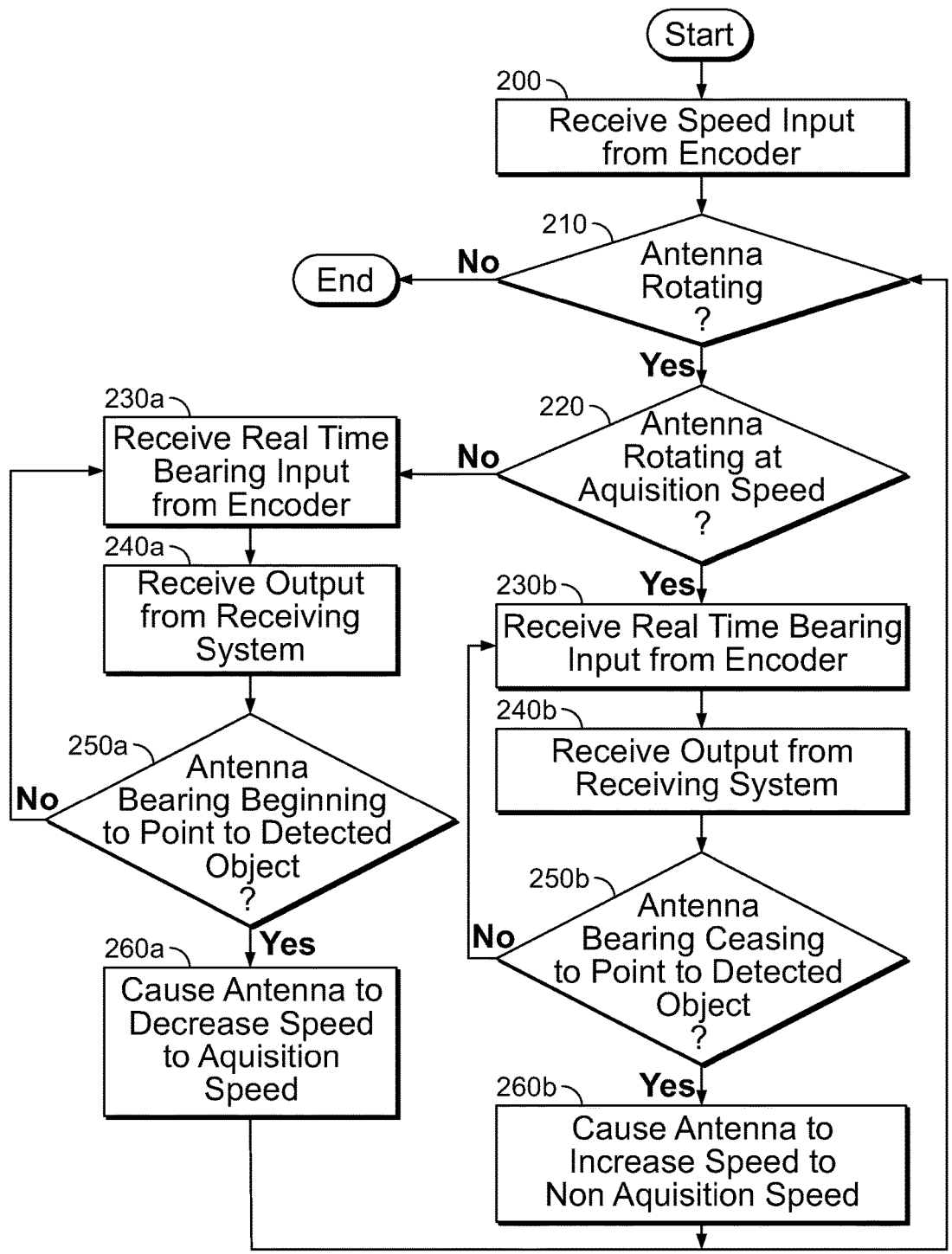
FIG. 2 shows the process through which an automatic real time control of radar antenna rotational speed system and method in accordance with the present invention adjusts the speed of the radar antenna.

Referring now to FIG. 2, a radar system employing a method for automatic real time control of the rotational speed of a radar antenna of a radar system begins at step 200 with a controller querying the speed at which a shaft holding the antenna is rotating. In one embodiment, this is done by receiving the output of a rotary encoder integral with the shaft. Provided the speed is greater than zero, which is confirmed at step 210, the controller determines whether the actual rotational speed as indicated by the rotary encoder is a slower, object acquisition speed or a faster non acquisition speed at step 220. The controller then determines the location of detected objects as a function of the bearing of the antenna. To make this determination, the controller uses (1) an input from the rotary encoder which defines the ongoing real time bearing of the antenna (based on the position of the shaft) provided at step 230a or 230b and (2) an output provided at step 240a or 240b from the receiving system of the radar system which identifies objects that have been detected.

With this determination, if the antenna is not already rotating at the acquisition speed, the controller determines the moment the bearing of the antenna is such that the antenna begins acquiring data on a detected object at step 250a. At that moment the controller sends a control signal, at step 260a, to a control switch that is integrated with a motor that is rotating the antenna of the radar system to cause the motor to slow the rotation of the antenna to the acquisition speed. In this manner, the controller performs a step of causing the rotating antenna to rotate slower.

If the antenna is already rotating at the acquisition speed, the controller determines the moment the bearing of the antenna is such that the antenna stops acquiring data on a detected object at step 250b. At that moment, the controller sends a signal, at step 260b, to the control switch to cause the motor to speed up the rotation of the antenna to a non acquisition speed. In this manner, the controller performs a step of causing the rotating antenna to rotate faster.

Once the controller causes the rotation of the antenna to speed up or slow down at step 260a or 260b, the controller continues monitoring the input from the rotary encoder which defines the ongoing real time bearing of the antenna and the output of the receiving system. The controller also continues switching the rotational speed of the antenna as long as the antenna continues to rotate.

The control switch may alternatively operate as a momentary switch which causes the rotation of the antenna to speed up only while a signal from the controller is received. In this case, the controller would send a continuous signal to the control switch while the bearing of the antenna is such that the antenna is acquiring data on a detected object.

Alternatively, a motor that also could change the rotation direction of the antenna instead of just its speed in response to a signal is employed. It is contemplated, however, that as usually the radar antenna is a heavy object, it would require significantly more motor power to fully stop the rotation in one direction and move it in the other direction. In addition, a continuous motion would act to prevent visual detection of a ship's area of interest due to a loss of coverage while stopping and changing direction.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A method for automatic real time control of a rotational speed of a radar antenna, comprising the steps of:
    providing a radar system having a rotating antenna adapted to emit radar waves while rotating three hundred sixty degrees at a first rotational speed, wherein the radar system is electronically connected to a receiving system, wherein the receiving system is adapted to determine a location of an object off which the radar waves emitted from the rotating antenna were reflected;
    receiving an angle input which identifies a real time rotation angle of the rotating antenna;
    identifying at least one target object off which radar waves emitted from the rotating antenna were reflected;
    determining the location of the at least one target object as a function of the rotation angle of the rotating antenna; and
    once the location of the at least one target object is determined as a function of the rotation angle of the rotating antenna, adjusting a rotational speed of the rotating antenna based on whether radar waves emitted from the rotating antenna are emitted in a direction of the at least one target object, wherein the rotational speed is adjusted relative to the first rotational speed.

2. The method of claim 1, wherein the step of causing is performed by sending a control signal to a control switch that is integrated with the rotating antenna, wherein said control switch is operative to cause the rotational speed of the rotating antenna to adjust upon receipt of the control signal.

3. The method of claim 2, wherein the control switch is integrated with the rotating antenna by being operatively connected to a motor that controls a rotation of the rotating antenna such that the motor can receive commands related to operational speed from the control switch and, in response to such commands, adjust the operational speed of the motor.

4. The method of claim 1, wherein the step of causing is performed by sending a control signal to a control switch that is integrated with the rotating antenna, wherein said control switch is operative to cause the rotational speed of the rotating antenna to adjust while receiving the control signal.

5. The method of claim 4, wherein the control switch is integrated with the rotating antenna by being operatively connected to a motor that controls a rotation of the rotating antenna such that the motor can receive commands related to operational speed from the control switch and, in response to such commands, adjust the operational speed of the motor.

6. The method of claim 1, wherein the angle input is received from a rotary encoder that is integrated with the rotating antenna.

7. The method of claim 1, wherein the step of determining is performed by recognizing the real time rotation angle of the rotating antenna when the at least one target object is identified.

8. A method for automatic real time control of rotational speed of a radar antenna, comprising the steps of:
    providing a radar system having a rotating antenna adapted to emit radar waves while rotating three hundred sixty degrees at a first rotational speed, wherein the radar system is electronically connected to a receiving system, wherein the receiving system is adapted to determine a location of an object off which the radar waves emitted from the rotating antenna were reflected;
    receiving an angle input which identifies a real time rotation angle of the rotating antenna from a rotary encoder that is integrated with the rotating antenna;
    identifying at least one target object off which radar waves emitted from the rotating antenna were reflected;
    determining the location of the at least one target object as a function of the rotation angle of the rotating antenna by recognizing the real time rotation angle of the rotating antenna when the at least one target object is identified; and
    once the location of the at least one target object is determined as a function of the rotation angle of the rotating antenna, causing the rotating antenna to rotate at least one of: a second rotational speed that is faster than the first rotational speed while the radar waves emitted from the rotating antenna are not being emitted in a direction of the at least one target object, and slower than the second rotational speed while radar waves emitted from the rotating antenna are being emitted in the direction of the at least one target object.

9. The method of claim 8, wherein the step of causing is performed by sending a control signal to a control switch that is integrated with the rotating antenna, wherein said control switch is operative to cause a rotational speed of the rotating antenna to adjust upon receipt of the control signal.

10. The method of claim 9, wherein the control switch is integrated with the rotating antenna by being operatively connected to a motor that controls a rotation of the rotating antenna such that the motor can receive commands related to operation speed from the control switch and, in response to such commands, adjust an operational speed of the motor.

11. The method of claim 8, wherein the step of causing is performed by sending a control signal to a control switch that is integrated with the rotating antenna, wherein said control switch is operative to cause a rotational speed of the rotating antenna to adjust while receiving the control signal.

12. The method of claim 11, wherein the control switch is integrated with the rotating antenna by being operatively connected to a motor that controls a rotation of the rotating antenna such that the motor can receive commands related to operational speed from the control switch and, in response to such commands, adjust the operational speed of the motor.

13. A system having automatic real time control of rotational speed of a radar antenna, comprising:
    a radar system having a rotating antenna adapted to emit radar waves while rotating three hundred sixty degrees at a first rotational speed, wherein the radar system is electronically connected to a receiving system, the receiving system being adapted to determine a location of an object off which the radar waves emitted from the rotating antenna were reflected;
    a controller integral with said radar system, wherein said controller is adapted to: receive an angle input which identifies a real time rotation angle of the rotating antenna, identify at least one target object off which radar waves emitted from the rotating antenna were reflected, and determine the location of the at least one target object as a function of the rotation angle of the rotating antenna; and
    wherein said controller is additionally adapted, once the location of the at least one target object is determined as a function of the rotation angle of the rotating antenna, to cause the rotating antenna to rotate at least one of: a second rotational speed that is faster than the first rotational speed while the radar waves emitted from the rotating antenna are not being emitted in a direction of the at least one target object, and slower than the second rotational speed while radar waves emitted from the rotating antenna are being emitted in the direction of the at least one target object.

14. The system having automatic real time control of the rotational speed of a radar antenna of claim 13, wherein said controller causes the rotating antenna to rotate faster by sending a control signal to a control switch that is integrated with the rotating antenna and operative to cause a rotational speed of the rotating antenna to adjust upon receipt of the control signal.

15. The system having automatic real time control of the rotational speed of a radar antenna of claim 14, wherein the control switch is integrated with the rotating antenna by being operatively connected to a motor that controls a rotation of the rotating antenna such that the motor can receive commands related to operational speed from the control switch and, in response to such commands, adjust the operational speed of the motor.

16. The system having automatic real time control of the rotational speed of a radar antenna of claim 13, wherein said controller causes the rotating antenna to rotate faster by sending a control signal to a control switch that is integrated with the rotating antenna, wherein said control switch is operative to cause the rotational speed of the rotating antenna to adjust while receiving the control signal.

17. The system having automatic real time control of the rotational speed of a radar antenna of claim 16, wherein the control switch is integrated with the rotating antenna by being operatively connected to a motor that controls a rotation of the rotating antenna such that the motor can receive commands related to operational speed from the control switch and, in response to such commands, adjust the operational speed of the motor.

18. The system having automatic real time control of the rotational speed of a radar antenna of claim 13, additionally comprising a rotary encoder that is integrated with the rotating antenna and adapted to generate the angle input, wherein the controller receives the angle input from the rotary encoder.

19. The system having automatic real time control of the rotational speed of a radar antenna of claim 18, wherein the rotary encoder is adapted to generate the angle input based on the bearing of a shaft that connects the rotating antenna with a motor that controls a rotation of the rotating antenna.

20. The system having automatic real time control of the rotational speed of a radar antenna of claim 13, wherein the controller determines the location of the at least one target object as a function of the rotation angle of the rotating antenna by recognizing the real time rotation angle of the rotating antenna when the at least one target object is identified.

* * * * *